United States Patent
Meschter et al.

(10) Patent No.: US 6,969,555 B2
(45) Date of Patent: Nov. 29, 2005

(54) ALUMINATE COATING FOR A SILICON CONTAINING SUBSTRATE

(75) Inventors: Peter Joel Meschter, Niskayuna, NY (US); David Joseph Mitchell, Niskayuna, NY (US); Krishan Lal Luthra, Schenectady, NY (US); Jennifer Su Saak, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/678,815

(22) Filed: Oct. 6, 2003

(65) Prior Publication Data

US 2005/0074625 A1 Apr. 7, 2005

(51) Int. Cl.$^7$ .............................. B32B 9/04; F03B 3/12; C23C 16/06
(52) U.S. Cl. .................... 428/448; 428/446; 428/697; 428/699; 428/701; 428/702; 428/698; 416/241 B; 427/255.19; 427/427
(58) Field of Search ................ 428/697, 699, 428/701, 702, 446, 448, 698; 416/241 B; 427/255.19, 427

(56) References Cited

U.S. PATENT DOCUMENTS

| | | | |
|---|---|---|---|
| 5,391,404 A | 2/1995 | Lee et al. | |
| 5,496,644 A | 3/1996 | Lee et al. | |
| 5,869,146 A | 2/1999 | McCluskey et al. | |
| 5,985,470 A | 11/1999 | Spitsburg et al. | |
| 6,127,048 A | * 10/2000 | Beele | 428/623 |
| 6,129,954 A | 10/2000 | Spitsburg et al. | |
| 6,254,935 B1 | 7/2001 | Eaton et al. | |
| 6,284,325 B1 | 9/2001 | Eaton, Jr. et al. | |
| 6,296,909 B1 | 10/2001 | Spitsburg et al. | |
| 6,296,941 B1 | 10/2001 | Eaton, Jr. et al. | |
| 6,296,942 B1 | 10/2001 | Eaton, Jr. et al. | |
| 6,299,988 B1 | 10/2001 | Wang et al. | |
| 6,312,763 B1 | 11/2001 | Eaton, Jr. et al. | |
| 6,352,790 B1 | 3/2002 | Eaton et al. | |
| 6,365,288 B1 | 4/2002 | Eaton et al. | |
| 6,387,456 B1 | 5/2002 | Easton, Jr. et al. | |
| 6,410,148 B1 | 6/2002 | Eaton, Jr. et al. | |
| 6,444,335 B1 | 9/2002 | Wang et al. | |
| 6,485,848 B1 | 11/2002 | Wang et al. | |
| 6,699,607 B1 | * 3/2004 | Spitsberg | 428/702 |
| 2002/0025454 A1 | 2/2002 | Wang et al. | |
| 2002/0136835 A1 | 9/2002 | Li et al. | |
| 2002/0164430 A1 | * 11/2002 | Heimberg et al. | 427/419.1 |
| 2003/0003328 A1 | 1/2003 | Spitsburg et al. | |
| 2003/0113552 A1 | 6/2003 | Sun et al. | |
| 2003/0113553 A1 | 6/2003 | Sun et al. | |
| 2003/0113559 A1 | 6/2003 | Eaton et al. | |
| 2004/0028941 A1 | * 2/2004 | Lane et al. | 428/689 |
| 2004/0057832 A1 | * 3/2004 | Fleck et al. | 416/241 B |
| 2004/0115471 A1 | * 6/2004 | Nagaraj et al. | 428/660 |

FOREIGN PATENT DOCUMENTS

| | | |
|---|---|---|
| EP | 0 993 423 | 4/2000 |
| EP | 0 993 424 | 4/2000 |
| WO | WO 99/58472 | 11/1999 |
| WO | WO 00/64836 | 11/2000 |

* cited by examiner

*Primary Examiner*—Jennifer McNeil
(74) *Attorney, Agent, or Firm*—Paul J. DiConza; William E. Powell, II

(57) ABSTRACT

A coating for silicon based materials such as those used in high temperature, aqueous environments. An aspect of the invention is directed to an article including a silicon based substrate, a bond coat comprising silicon, and a barrier coat. The barrier coat includes an aluminate such as an alkaline earth metal aluminate or a rare earth aluminate. The barrier coat may be an intermediate coat between the bond coat and a top coat, or it may be the top coat.

23 Claims, 2 Drawing Sheets

US 6,969,555 B2

ALUMINATE COATING FOR A SILICON CONTAINING SUBSTRATE

BACKGROUND OF THE INVENTION

This invention relates generally to barrier coatings, and more particularly to barrier coatings for use in high temperature, aqueous environments.

Ceramic materials containing silicon and alloys containing silicon have been proposed for structures used in high temperature applications, such as gas turbine engines, heat exchangers, internal combustion engines, and the like. These materials are particularly useful in gas turbine engines which operate at high temperatures in aqueous environments.

The desired lifetime for components in such turbine applications may be tens of thousands of hours at temperatures above about 1000° C., for example. However, the components are known to experience significant surface recession under exposure to high-temperature, aqueous environments. Volatile silicon-based gaseous species typically form at temperatures above 1000° C., which causes the surface of the components to recede. The rate of recession may be 0.254 mm (0.010 in) or more per 1000 hours, for example, depending on the combustion conditions such as temperature and water vapor concentration in the combustion gas. This rate is unacceptably high for many component lifetime requirements.

An environmental barrier coating can protect the component from direct water-vapor exposure and inhibit volatilization. One proposed solution is a three layer environmental barrier coating as described in U.S. Pat. Nos. 6,387,456 and 6,410,148, which includes a silicon bond coat, a mullite and barium strontium aluminosilicate (BSAS) intermediate layer, and a pure BSAS top layer. However, after exposure to temperatures above about 1200° C. for long periods of time, the recession rate of BSAS may be unacceptably high for extended lifetime requirements. Furthermore, chemical reactions occur resulting in consumption of the bond coat and intermediate coat, which may still reduce the component lifetime below the desired level.

These and other drawbacks are present in known systems and techniques.

SUMMARY OF THE INVENTION

According to one embodiment, the invention relates to an article comprising a substrate comprising silicon, a bond coat on the substrate, the bond coat comprising silicon, at least one intermediate coat on the bond coat, and a top coat on at least one intermediate coat, the top coat comprising a majority of an aluminate. The aluminate may comprise an alkaline earth metal aluminate or a rare earth aluminate, for example.

According to another embodiment, the invention relates to an article comprising a substrate comprising silicon, a bond coat on the substrate, and a barrier coat on the bond coat, wherein a majority of the barrier coat comprises an aluminate. The barrier coat may comprise one or more layers. The aluminate may comprise an alkaline earth metal aluminate or a rare earth aluminate, for example. The article may further comprise a top coat on the barrier coat.

The invention also relates to a method for providing an article comprising applying a bond coat comprising silicon on a substrate comprising silicon, and applying a barrier coat on the bond coat, wherein a majority of the barrier coat comprises an aluminate. The method may further comprise applying at least one intermediate coat between the bond coat and the barrier coat, and/or applying a top coat on the barrier coat.

DETAILED DESCRIPTION OF EXEMPLARY EMBODIMENTS

An exemplary embodiment of the invention is directed to an environmental barrier coating for a substrate comprising silicon, which may be used in a gas turbine engine, for example. When used in a high temperature aqueous environment, the environmental barrier coating can retard the rate at which the surface of the substrate recedes as a result of volatilization. By high temperature environment is meant the temperature at which the silicon in the substrate forms gaseous Si—O and/or Si—O—H species in an aqueous environment. By aqueous environment is meant an environment including water, humid air, water vapor, combustion gases, and/or steam, for example.

Figure 1:
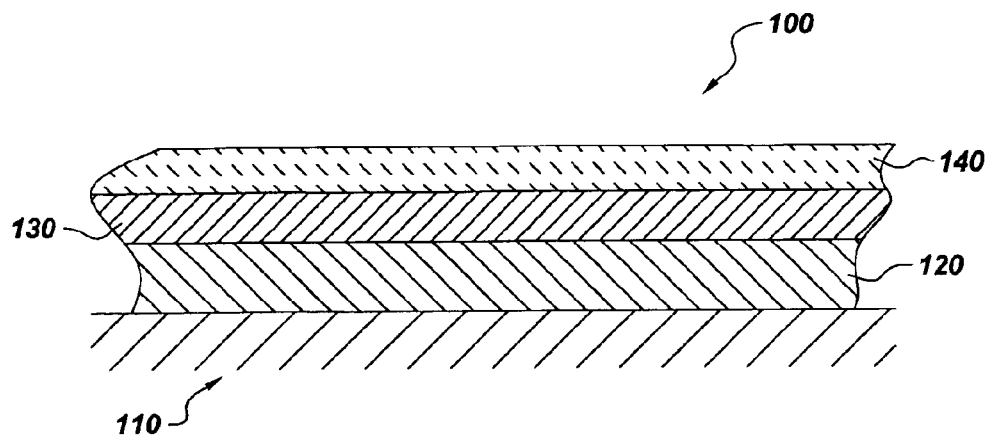
FIG. 1 is a cross-sectional view of an article in accordance with an exemplary embodiment of the invention.

FIG. 1 illustrates an environmental barrier coating according to an exemplary embodiment of the invention. As shown in FIG. 1, the coating is applied to a substrate 110. The coating comprises a bond coat 120, an intermediate coat 130, and a top coat 140. The intermediate coat 130 is optional. If it is included, it may comprise a single coat or a plurality of coats.

The substrate 110 may be any material comprising silicon, such as a ceramic or metal alloy, for example. In some exemplary embodiments, the substrate may comprise a ceramic material, such as silicon carbide, silicon nitride, silicon carbon nitride, silicon oxynitride, and/or silicon aluminum oxynitride, for example. In other embodiments, the substrate may comprise a matrix with reinforcing materials such as fibers, particles, and the like, and more particularly, a matrix comprising silicon and/or silicon carbide which is fiber reinforced. Suitable ceramic substrates include a silicon carbide fiber-reinforced silicon carbide matrix, a carbon-fiber reinforced silicon carbide matrix, or a silicon carbide fiber-reinforced silicon nitride matrix, for example. Suitable silicon carbide fibers include polymer derived fibers that may also include nitrogen, boron, and oxygen in addition to silicon and carbon. The carbon to silicon ratio may be different from that in pure silicon carbide. Examples of polymer derived fibers include HI-NICALON and HI-NICALON S fibers from Nippon Carbon of Tokyo, Japan, and TYRANNO SA fibers available from UBE Industries of Tokyo, Japan, for example. Suitable silicon carbide fibers may also include silicon carbide monofilaments made by CVD or fiber tows made by processing routes other than polymer processing, for example. Suitable silicon-metal alloy substrates include molybdenum-silicon alloys, niobium-silicon alloys and iron-silicon alloys, for example.

The substrate 110 is coated with a bond coat 120, which comprises silicon according to an exemplary embodiment of the invention. The bond coat 120 may comprise silicon metal applied to the substrate 110 at a thickness of about 0.0253 to about 0.506 mm (1 to 20 mils), and more typically about 0.051 to about 0.152 mm (2 to 6 mils), for example. The bond coat 120 can prevent oxidation of the underlying substrate 110 and a corresponding release of gases, formation of gas bubbles, and spallation of the environmental barrier coating. The bond coat 120 can also provide improved adhesion of subsequently applied coats, such as the intermediate coat 130 and the top coat 140. The bond coat 120 can also decrease the risk that application of the intermediate coat 130 and/or the top coat 140 will damage the underlying substrate 110. The bond coat 120 can be applied to the substrate 110 by any known method of depositing a solid coating, such as by thermal spraying.

The intermediate coat 130 comprises any composition which is capable of adhering to the bond coat 120 and the top coat 140. The intermediate coat 130 typically has a coefficient of thermal expansion within about 20% of that of the bond coat 120 and the top coat 140. The intermediate coat 130 can be applied to the bond coat 120 by any known method of depositing a solid coating, such as by thermal spraying. According to one embodiment, the intermediate coat comprises barium strontium aluminosilicate (BSAS) or a mixture of BSAS and mullite. Typically, a single intermediate coat 130 is used. However, if desired, two or more intermediate coats 130 can be applied between the bond coat 120 and the top coat 140. Alternately, the intermediate coat 130 can be omitted entirely.

The top coat 140 may comprise what is sometimes referred to as a barrier coat. According to one embodiment, the top coat 140 comprises a barrier coat comprising a majority (greater than 50% by volume) of an aluminate. Higher percentages of aluminate, such as greater than 80% by volume are preferred including a barrier coat which consists of, or consists essentially of, aluminate. Aluminates are a class of compounds which have the general formula $(MO_x)_y \cdot (Al_2O_3)_z$, where M is a metal, and x=0.5–15, y=1–15, and z=1–15. The metal M may comprise Ca, Ba, Sr, Mg, Sc, Y, La, Dy, Ho, Er, Tm, Yb, and/or Lu, for example.

According to one embodiment, the aluminate comprises an alkaline earth metal aluminate, preferably an alkaline earth metal aluminate where M=Ca, Ba, Sr, or Mg, or a mixture of two or more of these compounds. The barrier coat may comprise one or more phases of the aluminate. An environmental barrier coating which includes such a barrier coat can provide improved resistance to recession of substrates comprising silicon when exposed to high temperature aqueous environments for prolonged periods. A barrier coat having these compositions can exhibit volatilization resistance and low surface recession when used on a substrate exposed to high temperature aqueous environments.

According to another embodiment, the aluminate comprises a rare earth aluminate, where M=Sc, Y, La, Dy, Ho, Er, Tm, Yb, and/or Lu, or a mixture of two or more of these compounds. Rare earth aluminates are expected to have low recession and low volatilization rates in high temperature aqueous environments based on low vapor pressures of gaseous species in equilibrium with the rare earth aluminates, rare earth oxides and alumina, in these environments.

Starting materials for creating a composition used in the barrier coat 140 may include a compound of an alkaline earth metal oxide and alumina, for example. When these materials are mixed, the alkaline earth metal oxide and alumina react to form an alkaline earth metal aluminate. When mixed in stoichiometric proportions, the starting materials can react completely to form a compound for use as a barrier coat which consists of, or consists essentially of, one or more alkaline earth metal aluminates. The aluminate may be present in various phases, depending on the molar ratio of starting materials used. For example, starting materials of CaO and $Al_2O_3$ may be reacted in a 1:1 molar ratio to yield $CaAl_2O_4$, or they may be reacted in a molar ratio of 1:2 to yield $CaAl_4O_7$. Typically, the barrier coat 140 comprises a mixture of phases, such as a mixture of $CaAl_2O_4$ and $CaAl_4O_7$, for example. More typically, the barrier coat comprises a mixture of phases in which the phase resulting from starting materials of the 1:2 molar ratio is present in a higher percentage compared to other phases. The barrier coat 140 may comprise a mixture of multiple phases of the same aluminate, such as a mixture of $CaAl_2O_4$ and $CaAl_4O_7$, for example, or a mixture of one or more phases of more than one alkaline earth metal aluminate, e.g., one or more phases of more than one of: calcium aluminate, strontium aluminate, barium aluminate, and magnesium aluminate. Although the barrier coat 140 may comprise excess alkaline earth metal oxide, excess alumina, or other small amounts of impurities, the effectiveness of the barrier coat may be enhanced by high percentages of alkaline earth metal aluminate in the barrier coat. The barrier coat can be applied to the intermediate coat 130 by any known method of depositing a solid coating, such as by thermal spraying.

The substrate 110 comprising silicon is preferably cleaned prior to application of any coat to remove any remaining contamination from substrate fabrication. The substrate 110 can be cleaned by grit-blasting, for example. The grit particle is preferably hard enough to remove undesired contamination and roughen the surface of the substrate 110. The grit particle size is preferably small enough to prevent impact damage to the substrate. One example of a method of grit blasting utilizes alumina particles having a particle size of less than or equal to 30 microns at a velocity of about 150 to about 200 m/sec.

If a bond coat 120 of silicon metal is applied to the substrate 110, the silicon may be applied directly to the grit blasted surface of the substrate 110, for example by thermal spraying on the substrate 110 when the substrate 110 is at a temperature of about 100 to about 400° C. The bond coat 120 may be applied as a thin layer while still completely covering the substrate 110 to avoid any bare spots. Typically, the bond coat 120 has a thickness of between about 0.0253 and about 0.506 mm (1–20 mils), preferably between about 0.051 to 0.152 mm (2–6 mils).

The intermediate coat 130 and the top coat 140 may be applied by thermal spraying at a substrate temperature of between about 100 and about 400° C., for example. These coats may be sprayed to a thickness greater than about 0.013 mm (0.5 mils), preferably between about 0.076 to about 0.76 mm (3–30 mils) and more preferably between about 0.076 to about 0.127 mm (3–5 mils).

Following thermal spraying, the article may be heat treated to crystallize and/or chemically equilibrate phases in the applied coats, to provide stress relief in the thermal sprayed article and to promote bonding between coats. Generally, this heat treatment involves controlled heating of the article over time.

Figure 2:
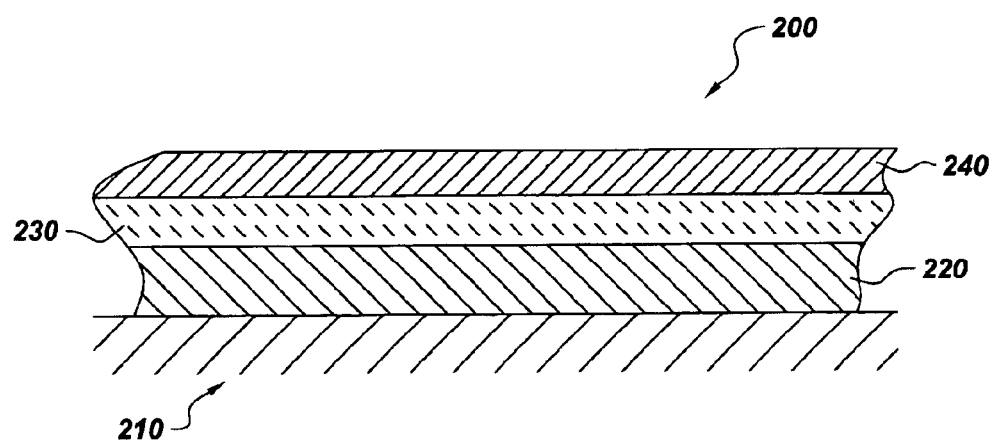
FIG. 2 is a cross-sectional view of an article in accordance with another embodiment of the invention.

Another embodiment of an environmental barrier coating is shown in FIG. 2. The environmental barrier coating comprises a bond coat 220, an intermediate coat 230, and a top coat 240. The bond coat 220 comprises a silicon layer as described above. In this embodiment, the intermediate coat 230 comprises the barrier coat comprising an aluminate, typically an alkaline earth metal aluminate or a rare earth aluminate. The top coat 240 comprises any coat which is chemically and thermally compatible to the intermediate coat 230. Typically, the top coat 240 has a coefficient of thermal expansion within about 20% of that of the intermediate coat 230.

EXAMPLE

Sintered pellets of compositions corresponding to a barrier coat having a composition in accordance with one aspect of the present invention (calcium aluminate) and a barrier coat comprising BSAS were prepared and tested. The calcium aluminate pellets and the BSAS pellets were then exposed to a high temperature, aqueous environment. Each pellet's weight loss was measured as a function of time that the pellet was exposed to the environment.

Calcium aluminate was prepared from a starting mixture of 40 mol % $Al_2O_3$ powder and 60 mol % CaO powder. Both of these powders were 99.99% pure having a −325 mesh particle size. They were obtained from Cerac, Inc. of Milwaukee, Wis. The $Al_2O_3$ and CaO powders were mixed with ethanol and zirconia milling media in a polyethylene bottle and ball-milled for about 12 hours. The mixture was dried at 90° C. and sieved through a 100 mesh screen. The sieved powders were cold pressed into circular pellets at $2.76 \times 10^4$ kPa (4 kpsi) in a 22.23 mm (⅞ in) diameter die. The circular pellets were isostatically pressed at $2.01 \times 10^5$ kPa (30 kpsi) in latex tubing and then sintered for 2 hours at 1500° C. in air. X-ray diffraction of the pellets showed the presence of two calcium aluminate phases: $CaAl_2O_4$ and $CaAl_4O_7$.

BSAS pellets were produced in a similar manner from BSAS powder obtained from H.C. Starck, Inc. of Newton, Mass. The BSAS powder was cold pressed and isostatically pressed into pellets. The BSAS pellets were sintered for 2 hours at 1600° C. in air. X-ray diffraction showed the presence of celsian BSAS.

Five specimens of each of the calcium aluminate and BSAS pellets were prepared for furnace testing in a steam environment. The calcium aluminate and BSAS samples were run independently. Rectangular samples were cut from the pellets using a diamond saw. An ultrasonic core drill was used to drill a 3.175 mm (⅛ in) diameter hole 1.588 mm (1/16 in) from an edge of the rectangular sample.

The samples were hung in a vertical tube furnace at 1315° C. for about 100 to about 125 hours with a water vapor flow rate of 4 cm/s having a composition of 90% $H_2O$ and 10% $O_2$ by volume. Periodically, the samples were removed from the furnace to obtain weight measurements. The weight losses of the samples were normalized against the surface area of the specimens to more accurately compare results. Results from various exposure times are shown below in Table 1:

TABLE 1

| Time of Exposure (h) | Specific Weight Change of Calcium Aluminate (g/cm²) | Specific Weight Change of BSAS (g/cm²) |
| --- | --- | --- |
| 8 | $-1.0 \times 10^{-5}$ | $-5.5 \times 10^{-5}$ |
| 50 | $-3.7 \times 10^{-5}$ | $-1.4 \times 10^{-4}$ |
| 100 | $-5.7 \times 10^{-5}$ | $-2.9 \times 10^{-4}$ |

Figure 3:
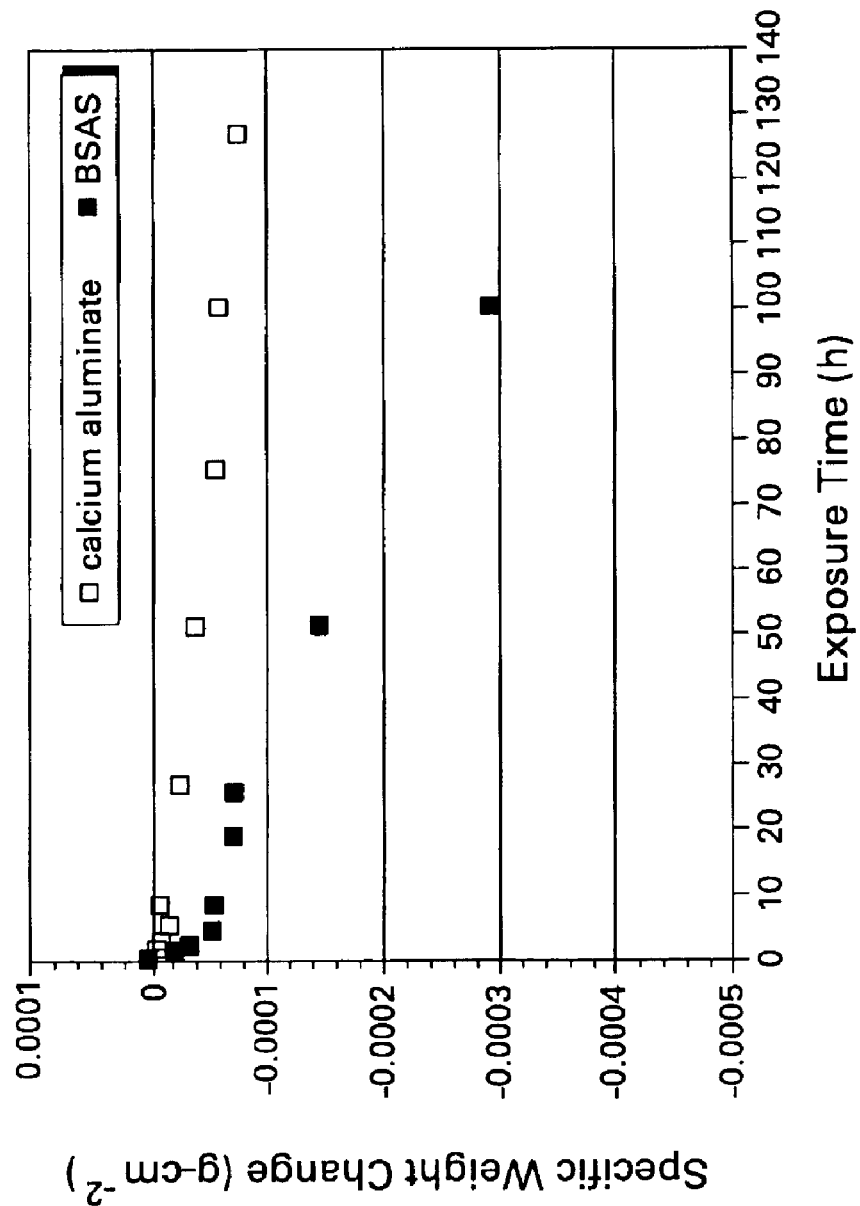
FIG. 3 is a graph showing weight loss with respect to time for an exemplary embodiment of the invention.

FIG. 3 shows a graph which compares the weight loss data from the calcium aluminate samples against the weight loss of the BSAS samples in the same high temperature, aqueous environment as a function of time. As FIG. 3 shows, calcium aluminate exhibits a slower rate of weight loss than BSAS, indicating a better resistance to recession in the experimental environment.

While the foregoing specification illustrates and describes exemplary embodiments of this invention, it is to be understood that the invention is not limited to the construction disclosed herein. The invention can be embodied in other specific forms without departing from the spirit or essential attributes. Accordingly, reference should be made to the following claims, rather than to the foregoing specification, as indicating the scope of the invention.

What is claimed is:

1. An article comprising
    a substrate comprising at least one selected from the group consisting of silicon carbide and silicon nitride;
    a bond coat on the substrate, said bondcoat comprising silicon metal; and
    a barrier coat on the bond coat, wherein a majority of the barrier coat comprises an aluminate selected from consisting of a rare earth aluminate, calcium aluminate, magnesium aluminate, and combinations thereof.

2. The article of claim 1, wherein the barrier coat comprises calcium aluminate.

3. The article of claim 2, wherein the calcium aluminate comprises at least one of $CaAl_2O_4$ and $CaAl_4O_7$.

4. The article of claim 1, wherein the barrier coat consists essentially of magnesium aluminate.

5. The article of claim 1, wherein the barrier coat comprises at least one aluminate selected from the group consisting of the aluminates of scandium, yttrium, lanthanum, dysprosium, holmium, erbium, thulium, ytterbium, and lutetium.

6. The article of claim 1, wherein the substrate comprises silicon carbide fibers dispersed in a matrix material.

7. The article of claim 1, wherein the substrate comprises a silicon carbide matrix.

8. The article of claim 1, the substrate comprises a silicon carbide reinforcement in a silicon carbide matrix.

9. The article of claim 1, wherein the substrate comprises a silicon carbide reinforcement in a silicon silicon-carbide matrix.

10. The article of claim 1, wherein the article is a component of a gas turbine engine.

11. The article of claim 1, wherein the aluminate is present as more than one phase.

12. The article of claim 1, further comprising a top coat on the barrier coat.

13. The article of claim 12, wherein the barrier coat comprises at least two layers.

14. An article comprising:
    a substrate comprising at least one selected from the group consisting of silicon carbide and silicon nitride;
    a bond coat on the substrate, said bondcoat comprising silicon metal;
    at least one intermediate coat on the bond coat; and
    a top coat on the at least one intermediate coat, wherein a majority of the to coat comprises an aluminate selected from the group consisting of a rare earth aluminate, calcium aluminate, magnesium aluminate, and combinations thereof.

15. The article of claim 14, wherein the top coat consists essentially of at least one selected from the group consisting of calcium aluminate, and magnesium aluminate.

16. The article of claim 14, wherein the top coat comprises at least one aluminate selected from the group consisting of the aluminates of scandium, yttrium, lanthanum, dysprosium, holmium, erbium, thulium, ytterbium, and lutetium.

17. The article of claim 14, wherein the intermediate coat comprises barium strontium aluminosilicate.

18. The article of claim 17, wherein the intermediate coat further comprises mullite.

19. A method for providing an article, the method comprising applying a bond coat comprising silicon metal on a substrate comprising at least one selected from the group consisting of silicon carbide and silicon nitride; and applying a barrier coat on the bond coat, wherein a majority of the barrier coat comprises an aluminate selected from the group consisting of a rare earth aluminate, calcium aluminate, magnesium aluminate, and combinations thereof.

20. The method of claim 19, further comprising the step of applying at least one intermediate coat between the bond coat and the barrier coat.

21. The method of claim 19, further comprising the step of applying a top coat on the barrier coat.

22. The method of claim 19, wherein the barrier coat consists essentially of at least one of calcium aluminate and magnesium aluminate.

23. The method of claim 19, wherein the barrier coat is applied by thermal spraying.

* * * * *